Patented July 30, 1946

2,404,896

UNITED STATES PATENT OFFICE 2,404,896

POLISHING WAX COMPOSITIONS

David Aelony, Dayton, Ohio, assignor to Monsanto Chemical Company, a corporation of Delaware No Drawing. Application December 31, 1942, Serial No. 470,873

8 Claims. (Cl. 106—8)

The present invention relates to new synthetic waxes and to compositions containing the same.

I have found that higher N-acyl derivatives of mono-aminobiphenyl having the general formula:

wherein R is an aliphatic hydrocarbon radical of from 7 to 35 carbon atoms, are highly valuable as wax substitutes in polishing compositions. Of particular interest are those N-acyl derivatives of mono-aminobiphenyl in which the acyl radical contains 12 or more carbon atoms, for example, N-hexacosoyl-p-aminobiphenyl, N-hexacosoyl-o-aminobiphenyl, N-hexacosoyl-m-aminobiphenyl, N-stearoyl-p-aminobiphenyl, N-stearoyl-o-aminobiphenyl, N-stearoyl-m-aminobiphenyl, etc.

Solid or liquid waxing and polishing compositions which contain compounds having the general formula given above are characterized by their ability to confer a hard, brilliant, substantially water-proof coating to materials to which they are applied. The higher N-acyl mono-aminobiphenyls may be employed alone in form of solutions or dispersions or, if desired, with other substances suitable for the superficial treatment of the material which is to be coated, as for example with other waxy substances of natural or synthetic origin, oils, resins, coloring materials, emulsifying agents, etc. The products thus obtained may be advantageously employed for the waterproofing and polishing of materials of all kinds, such as leather, wood, linoleum, etc. Compositions containing the present amides in conjunction with paraffin and turpentine are admirably suited as shoe polishes. Very desirable floor waxes are prepared by incorporating a higher N-acyl-mono-aminobiphenyl with a minor proportion of other waxy substances together with morpholine and water.

The function of waxes in polishing compositions is to form a continuous, lustrous film which is hard, pliable and substantially water-resistant. The film should not smear easily, but when it does become smeared, it should buff readily to the original shiny surface.

The most commonly used waxes are carnauba, candelilla, beeswax and paraffin. Carnauba is a somewhat crystalline, hard, shiny wax which possesses poor solvent retention. Candelilla is a medium hard wax. It has good solvent retention and serves as a good plasticizer for carnauba; however, it yields a smeary shine if present in more than 1:1 ratio with carnauba. Beeswax is a soft, sticky wax whose value lies in good solvent retention and in its plasticizing effect on the hard waxes. Paraffin is useful as a diluent for waxes and as a solvent retainer, but in itself it possesses no shining properties.

No commercial polish is made up of a single wax because at present there is no wax available in which there are combined all the desirable properties of the individual waxes. Carnauba wax is particularly desirable because it gives a film which is harder and more brilliant than that of the other commercially available waxes. However, it is by far the most expensive. Also, carnauba wax in common with most natural products exhibits considerable variations in composition, which variations are regarded as troublesome by progressive manufacturers. Since waxes used in polishes are generally employed in colloidal form, the physical properties of the polishes necessarily vary with changes in the composition of the ingredients. Hence, a synthetic product of constant composition but having the desirable properties of the natural wax would be preferable to the natural products.

I have found that with respect to hardness and gloss of film the present higher N-acyl derivatives of mono-aminobiphenyl are excellent substitutes for carnauba wax. Moreover, being synthetic products prepared from readily available domestic materials, i. e., biphenyl, nitric acid and higher fatty acids, their use in polishing compositions assures both constancy of product and availability. The higher N-acyl derivatives of mono-aminobiphenyls are especially desirable as constituents of the gel type of shoe polishes, the substitution of the mono-amides for carnauba wax in this type of polish yielding products which possess the following characteristics: (a) ability to give a smooth, hard, shiny surface, (b) a sufficiently high softening temperature so that polishes do not liquefy in hot summer weather, (c) lack of blooming (crystallization on the surface) and (d) lack of hysteresis (release of a part of the solvent by the gel).

The higher N-acyl derivative of the mono-aminobiphenyls which are employed in the present invention may be readily obtained in good yields by the reaction of ortho-, para-, or meta-aminobiphenyl with higher fatty acids possessing from 8 to 36 carbon atoms or with technically available mixtures of such fatty acids. Instead of the fatty acids there may be employed the corresponding acyl halides or acid anhydrides. Admirably suited are the higher N-acyl derivatives of ortho-aminobiphenyl which are described in the copending application of Earl W. Gluesenkamp, Serial Number 435,835, filed March 23, 1942.

While I am aware that the higher N-acyl derivatives of para-diaminobiphenyl, i. e., benzidine have been previously suggested for use as wax substitutes in French Patent Number 842,725 to I. G. Farbenindustrie, the use of such benzidine derivatives for this purpose has never attained commercial application in that the melting points thereof, usually being in the neighborhood of 200° C., are too high to permit ready incorporation of the same into polishing compositions. In the industry, waxes are blended into such compositions by melting the same in steam-heated kettles, the temperature of which, accordingly, does not exceed 150° C. Moreover, the solvents which are employed, for example, mineral spirits, turpentine or benzene, boil at temperatures which are substantially below the melting point of the benzidine derivatives, hence incorporation of the same into such solvents often involves considerable solvent loss. On the other hand, the melting points of the N-acyl derivatives of the mono-aminobiphenyls, approximating that of the useful natural waxes, entail no change in operating procedures of the polish-manufacturing industries. The mono-acyl derivatives of benzidine, which have also been suggested are undesirable, particularly because of discoloration due to oxidation of the free amino group. Such discoloration would render the product unusable in neutral or light colored polishes. Moreover, the mono-derivative would be toxic.

The present invention is illustrated, but not limited, by the following examples:

Example 1

A typical wax gel shoe polish formula, exclusive of coloring matter, may be made in accordance with the following formula, the figures being expressed in percent by weight:

| | Per cent |
|---|---|
| Carnauba wax | 8 |
| Candelilla wax | 8 |
| Beeswax | 2 |
| Paraffin | 6 |
| Turpentine | 76 |

The substitution of either ortho- or para-stearamidobiphenyl for the carnauba wax in the above formula results in a polish which yields a film that is equal in gloss and hardness to that obtained from the carnauba-containing material. When formulating these and the following shoe polish compositions it is customary to melt the waxes, add the solvent, cool until a temperature of about 43° C. to 50° C. is reached, after which the polish is poured into cans. Variations may, of course, be made in the proportions of the various ingredients employed in order to obtain modifications as may be desirable.

Example 2

A wax gel shoe polish is prepared employing the following formula:

| | Per cent |
|---|---|
| o-Stearamidobiphenyl | 6 |
| Candelilla wax | 14 |
| Beeswax | 2 |
| Paraffin | 4 |
| Turpentine | 74 |

The above formula gives a gel of good consistency. Upon application to leather and subsequent buffing there is obtained a highly lustrous, hard and pliant film which does not smear.

Example 3

A wax gel shoe polish is prepared by the following formula:

| | Per cent |
|---|---|
| p-Stearamidobiphenyl | 11 |
| N-Stearoyl-alpha-naphthylamine | 8 |
| Paraffin | 6 |
| Beeswax | 2 |
| Turpentine | 73 |

The polish obtained is of as hard a consistency as that obtained from the carnauba wax formula given in Example 1. Upon application to leather and subsequent buffing it gives a glossy film which does not smear.

Example 4

A wax gel shoe polish is prepared by the following formula:

| | Per cent |
|---|---|
| p-Stearamidobiphenyl | 8 |
| Hydrogenated castor oil | 13 |
| Paraffin | 6 |
| Turpentine | 73 |

The polish obtained has the consistency of that obtained from the carnauba wax formula of Example 1. The p-stearamidobiphenyl formula of the present example yields a polish which when applied to leather and subsequent buffing gives a smooth, glossy, hard film that does not smear.

Example 5

A paste polish is prepared by employing the following formula:

| | Per cent |
|---|---|
| p-Stearamidobiphenyl | 8 |
| Hydrogenated castor oil | 8 |
| Paraffin wax | 8 |
| Mineral spirits | 76 |

The composition obtained may be employed with advantage for polishing wooden floors. The paste is of good consistency and yields upon application to porous materials, and subsequent buffing, a smooth, hard, glossy surface which is substantially unaffected by water at ordinary or moderately increased temperatures.

Example 6

A solution type of floor or furniture polish was prepared by using the following formula:

| | Per cent |
|---|---|
| o-Stearamidobiphenyl | 2 |
| Beeswax | 2 |
| Paraffin | 2 |
| Mineral spirits | 94 |

A clear solution of the waxy substances is thus obtained which solution is eminently suitable as a dressing and polishing composition for articles made of wood, or other porous materials.

Example 7

An emulsion type polish was prepared by employing the following formula:

| | Per cent |
|---|---|
| o-Stearamidobiphenyl | 7 |
| Beeswax | 1 |
| Paraffin | 2 |
| Stearic acid | 1 |
| Morpholine | 0.25 |
| Water | 88.75 |

Melt the waxes including the fatty acid and the stearamidobiphenyl by heating to a temperature just above the melting point of the mixture. Pour into the water containing the morpholine, stirring rapidly until a homogeneous emulsion is formed, then cool with gentle stirring until room temperature is reached. The resulting product was a white, mobile emulsion which showed no tendency to separate out upon prolonged standing. When applied to articles made of wood, or leather it gives a quick shiny film possessing resistance to wear, abrasion and water which is equal to or superior to films obtained by the employment of carnauba-containing polishes of the emulsion type.

I have referred specifically to N-acyl-substituted mono-aminobiphenyls in which the acyl group is the stearoyl group, because at the present time stearic acid is the most readily available of the fatty acids, but the employment of other high N-acyl derivatives of the mono-aminobiphenyls likewise results in the production of desirable liquid or solid polishing compositions.

While I have illustrated the use of the higher N-acylated mono-aminobiphenyls in combination with other waxes as the hardness- and gloss-imparting constituent of wax-compositions, these amides may likewise be used either alone, as such, or in form of solutions or emulsions in various media in order to confer hard, pliant and glossy films to surfaces upon which they are applied. The present mono-amides are waxy solids that are insoluble in water and soluble in the organic solvents which are customarily employed in the preparation of liquid type polishes. At the present time, however, from an economical standpoint the incorporation of the amides with the less expensive paraffin wax, hydrogenated castor oil, etc., is recommended.

What I claim is:

1. A paste-type polishing composition free from cellulose derivatives comprising stearamidobiphenyl, a wax and mineral spirits.

2. A polishing composition containing the following in per cent by weight:

| | Per cent |
|---|---|
| o-Stearamidobiphenyl | 6 |
| Candelilla wax | 14 |
| Beeswax | 2 |
| Paraffin | 4 |
| Turpentine | 74 |

3. A polishing composition containing the following materials in emulsified form:

| | Per cent |
|---|---|
| o-Stearamidobiphenyl | 7 |
| Beeswax | 1 |
| Paraffin | 2 |
| Stearic acid | 1 |
| Morpholine | 0.25 |
| Water | Balance |

4. A polishing composition, free from cellulose derivatives, and comprising natural waxes, N-stearoyl aminobiphenyl and turpentine as a solvent therefor.

5. A wax-type polishing composition, free from cellulose derivatives, and comprising a natural wax, paraffin wax, N-stearoyl aminobiphenyl, and mineral spirits as a solvent therefor.

6. A polishing composition, free from cellulose derivatives, and comprising N-stearoyl aminobiphenyl, candelilla wax, beeswax, paraffin and turpentine as a solvent therefor.

7. In the process of making polishing compositions comprising natural waxes, the improvement comprising substituting for a part of the natural wax an N-acyl aminobiphenyl in which the acyl group contains from 8 to 36 carbon atoms.

8. A polishing composition consisting principally of a mixture of natural and synthetic solid wax-like materials and a solvent therefor, said synthetic solid wax-like material being an N-acyl aminobiphenyl wherein the acyl group contains from 8 to 36 carbon atoms.

DAVID AELONY.